United States Patent
Dorsch et al.

(10) Patent No.: US 12,128,600 B2
(45) Date of Patent: Oct. 29, 2024

(54) DEVICE FOR REMOVING PLASTIC PRODUCTS

(71) Applicant: KOCHER-PLASTIK MASCHINENBAU GMBH, Sulzbach-Laufen (DE)

(72) Inventors: Tobias Dorsch, Obersontheim (DE); Thomas Haid, Oberrot (DE); Steffen Julinek, Sulzbach-Laufen (DE); Martin Kurz, Obersontheim-Engelhofen (DE)

(73) Assignee: KOCHER-PLASTIK MASCHINENBAU GMBH, Sulzbach-Laufen (DE)

( * ) Notice: Subject to any disclaimer, the term of this patent is extended or adjusted under 35 U.S.C. 154(b) by 314 days.

(21) Appl. No.: 16/963,921

(22) PCT Filed: Jan. 28, 2019

(86) PCT No.: PCT/EP2019/051937
§ 371 (c)(1),
(2) Date: Jul. 22, 2020

(87) PCT Pub. No.: WO2019/149641
PCT Pub. Date: Aug. 8, 2019

(65) Prior Publication Data
US 2021/0039303 A1    Feb. 11, 2021

(30) Foreign Application Priority Data
Feb. 3, 2018   (DE) .................. 10 2018 000 885.2

(51) Int. Cl.
*B29C 49/42*    (2006.01)
*B29C 49/70*    (2006.01)
*B29C 49/36*    (2006.01)

(52) U.S. Cl.
CPC .... *B29C 49/42069* (2022.05); *B29C 49/4273* (2013.01); *B29C 49/36* (2013.01); *B29C 2049/701* (2013.01)

(58) Field of Classification Search
CPC .................... B29C 49/4273; B29C 2049/701
See application file for complete search history.

(56) References Cited

U.S. PATENT DOCUMENTS 6,428 A   *   3/1831   Warner .................... 408/213
389,721 A   *   9/1888   Taber ................. B23B 31/1261
                                                        279/34

(Continued)

FOREIGN PATENT DOCUMENTS

CN   105081402 A   *   11/2015
DE   38 31 957         12/1989

(Continued)

OTHER PUBLICATIONS

Machine Translation of WO 2019/042908 (Year: 2023).*

(Continued)

*Primary Examiner* — Russell E Sparks
(74) *Attorney, Agent, or Firm* — WENDEROTH, LIND & PONACK. L.L.P.

(57) ABSTRACT

A device for removing plastic products (1) has at least one guiding and/or holding device with at least one rod body (7). In the context of a plastic forming process, the guiding and/or holding device is introduced into and removed from a plastic product (1), to take over and subsequently release the plastic product after forming for at least one further production step. A motion device (40) serves for inserting and removing the guiding and/or holding device into and from the plastic product (1), The motion device (40) moves the guiding and/or holding device axially in opposing directions of travel. At least one further motion device (35) is (Continued)

provided, which sets the guiding and/or holding device in rotational movement.

8 Claims, 5 Drawing Sheets

(56) References Cited

U.S. PATENT DOCUMENTS

| | | | |
|---|---|---|---|
| 5,503,885 A | 4/1996 | Anderson | |
| 8,729,431 B2* | 5/2014 | Winzinger | B29C 49/4205 |
| | | | 219/428 |
| 10,549,472 B2* | 2/2020 | Klatt | B29C 49/6418 |
| 2010/0187730 A1 | 7/2010 | Hintermeier | |
| 2010/0307309 A1 | 12/2010 | Hansen | |
| 2018/0079064 A1* | 3/2018 | Feldmann | B25F 5/001 |

FOREIGN PATENT DOCUMENTS

| | | | |
|---|---|---|---|
| DE | 10 2008 011 772 | 9/2009 | |
| DE | 20 2012 004 015 | 10/2012 | |
| DE | 10 2013 007 954 | 11/2014 | |
| EP | 0 539 169 | 4/1993 | |
| WO | WO-2004105986 A1 * | 12/2004 | ............ B23B 45/02 |
| WO | 2008/017481 | 2/2008 | |
| WO | WO-2019042792 A1 * | 3/2019 | ........... B23B 45/008 |
| WO | WO-2019042908 A1 * | 3/2019 | ........... B23B 45/008 |

OTHER PUBLICATIONS

Machine Translation of WO 2019/042792 (Year: 2023).*
Machine Translation of CN 105081402 (Year: 2024).*
International Search Report (ISR) issued Apr. 11, 2019 in International (PCT) Application No. PCT/EP2019/051937.

* cited by examiner

DEVICE FOR REMOVING PLASTIC PRODUCTS

FIELD OF THE INVENTION

The invention relates to a device for removing or demolding plastic products, such as for example containers, having at least one guiding and/or holding device. In the context of a plastic forming process, guiding and/or holding device is introduced into and removed from at least one plastic product, to take over and subsequently release the plastic product after forming for at least one further manufacturing step. A motion device serves for inserting and removing the guiding and/or holding device into and from the respective plastic product. The motion device moves the respective device axially in opposing directions of travel.

BACKGROUND OF THE INVENTION

If plastic products are produced industrially in large quantities by plastic forming processes, the mechanical handling of the plastic products within the production process is an important process step, favoring the rational and economic execution. As disclosed in DE 38 31 957 C1, the state of the art in this respect uses a device of the genus mentioned above in the context of a process based on the known BOTTELPACK™ system, in which containers are produced in an economic way from plasticized plastic material by automated forming (blowing or vacuum forming), filling and sealing. As explained in column 2, lines 61 and following pages of the aforementioned document, pins are provided as a guiding and holding device, which, by a motion device, engage with blind hole-like recesses formed in a waste rim zone of the produced ampoule blocks to take over the respective ampoule block and subsequently release it.

SUMMARY OF THE INVENTION

Based on this state of the art, the invention addresses the problem of providing a device which, while retaining the advantages of the known device described above, permits a particularly fast and safe sequence of the producing process of plastic products.

According to the invention, this problem is basically solved by a device having, as, an essential feature of the invention, at least one further motion device that sets the guiding and/or holding device in rotational movement. Because the guiding and holding device can be rotated, in addition to the motion device that, for machine handling, brings the guiding and holding device into and out of engagement with the respective plastic product, the process of removal or demolding, i.e. the motion of the guiding and holding device in the direction of travel releasing the plastic product, can be performed before the plastic product, which is heated in the course of the plastic forming process, has cooled down completely. The rotational motion generated by the further motion device prevents an adhesion or deformation effect during the retracting travel motion of the guiding and holding device, even if the plastic product is still partially in the plasticized state and has not yet fully cured. The faster release of the plastic products permits the plastic forming process to be performed having shorter cycle times, so that the device according to the invention permits the plastic forming process to be performed in a particularly fast and economical manner.

Where ampoules are referred to below, this term generally includes containers, in particular those produced by a blow-molding, filling and sealing process (BFS process).

In advantageous embodiments, the guiding and holding device has at least one rod body having a kind of drill head at one free end. In the area of its other free end, a pinion for a pinion drive as part of the further motion device and a rotary bearing are provided. These embodiments are advantageously usable for the machine handling of ampoule blocks, which are produced by the above-mentioned blow-molding, filling and sealing process (BFS process) and have in their waste rim zone, as shown in FIG. 1 of the above-mentioned DE 38 31 957 C1, blind-hole-like recesses for the engagement of pins. When the device according to the invention is used, the pins are formed by the drill tips of the rod bodies, which are set in rotation during the releasing travel motion by the pinion drive.

In embodiments of this type, a large number of rod bodies are provided. The rotary bearings of the rod bodies are always guided in pairs in a rotary support. The pinions of the rod bodies have a predeterminable axial distance from each other within the rotary support. The distance preferably corresponds at least to the height of a pinion. The axially offset arrangement of the pinions provides the advantageous option of arranging the pairs of rod bodies in the rotary bearing at an axial distance that is smaller than the pinion diameter, so that in an advantageous manner the rod bodies can be arranged in a denser succession to each other.

The arrangement can advantageously be made in such a way that the rotary supports are arranged on a carrier as part of the one motion device. By a drive, the motion device moves the rod bodies in parallel arrangement to each other in the axial direction of motion below a beam-like set-down table. The table permits the rod bodies to pass therethrough and to set down the plastic product on its upper side for the purpose of separating it from the assignable rod bodies.

In the case of the axially offset arrangement of the pinions, two toothed racks arranged one above. The other toothed rack can serve as pinion drives for the individual pinions of the rod bodies. The toothed racks form part of the further motion device, with one toothed rack actuating the pinion of the respective one rod body and the other toothed rack actuating the pinion of the respective further rod body, which toothed racks are accommodated, combined in a pair, in the respective associated rotary support of the carrier.

Both toothed racks can be arranged on a slide, which is movably guided along the carrier by a further drive.

Advantageously, the two drives used, i.e. the drive for the vertical travel motions of the rod bodies and the horizontal drive of the slide having the toothed racks, are formed by linear drives, in particular by electric spindle drives.

The drill head of the respective rod body can be formed by a drill tip having a drill thread. If the thread pitch is appropriately selected, an axial force component can be generated during the rotary motion in the respective blind hole of the plastic products, which rotary motion favors the releasing travel motion in the manner of an unscrewing.

With a special advantage, the device can be an interchangeable component of a blow-molding, filling and sealing machine used to produce the respective plastic product.

As shown in the document mentioned at the beginning, the respective plastic product can have a box-like projection at the foot outside of a filled container body as a waste rim zone. Into that projection, the respective drill head of the rod bodies penetrates in an impact-like manner while the plastic material is still soft. When or after the respective plastic product is placed on the set-down table, the rod bodies are removed from the plastic material of the projection while rotating the rod bodies.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure.

DETAILED DESCRIPTION OF THE INVENTION

Figure 1A:
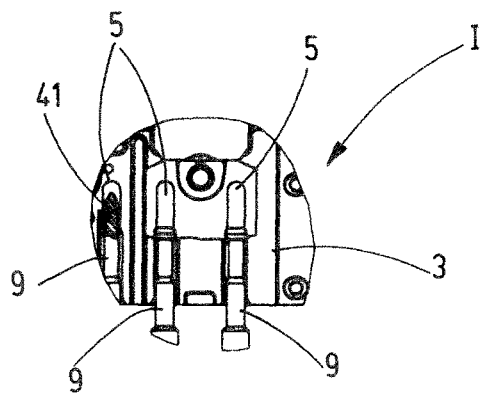
FIG. 1a is an enlarged partial front view of the area designated by I in FIG. 1.

With reference to the attached drawings, the invention is explained based on an exemplary embodiment, which is provided in the context of a plastic forming process for the machine-handling of plastic products produced in the plastic forming process. More precisely, the embodiment is provided to move ampoule blocks produced in a BFS process away from the manufacturing mold due to the engagement of a guiding and holding device and then to release the plastic products again by removing the engaged guiding and holding device. The ampoule blocks 1, of which only one is visible in the drawing in FIG. 1, correspond to a known product form as disclosed, for instance, in DE 38 31 957 C1. As shown in FIG. 1 of this document, these ampoule blocks have a box-shaped projection at the base outside of a row of filled container bodies. The projection forms a waste rim zone. In the projection, a row arrangement of blind hole-shaped recesses 5 is provided, with which pin-shaped engagement parts of the guiding and holding device engage for the transfer process. In FIGS. 1a, 2a, 3a and 4a, the respective waste rim zone 3 forming the projection of ampoule block 1 has the blind hole-shaped recesses 5 located in the projection.

Figure 5:
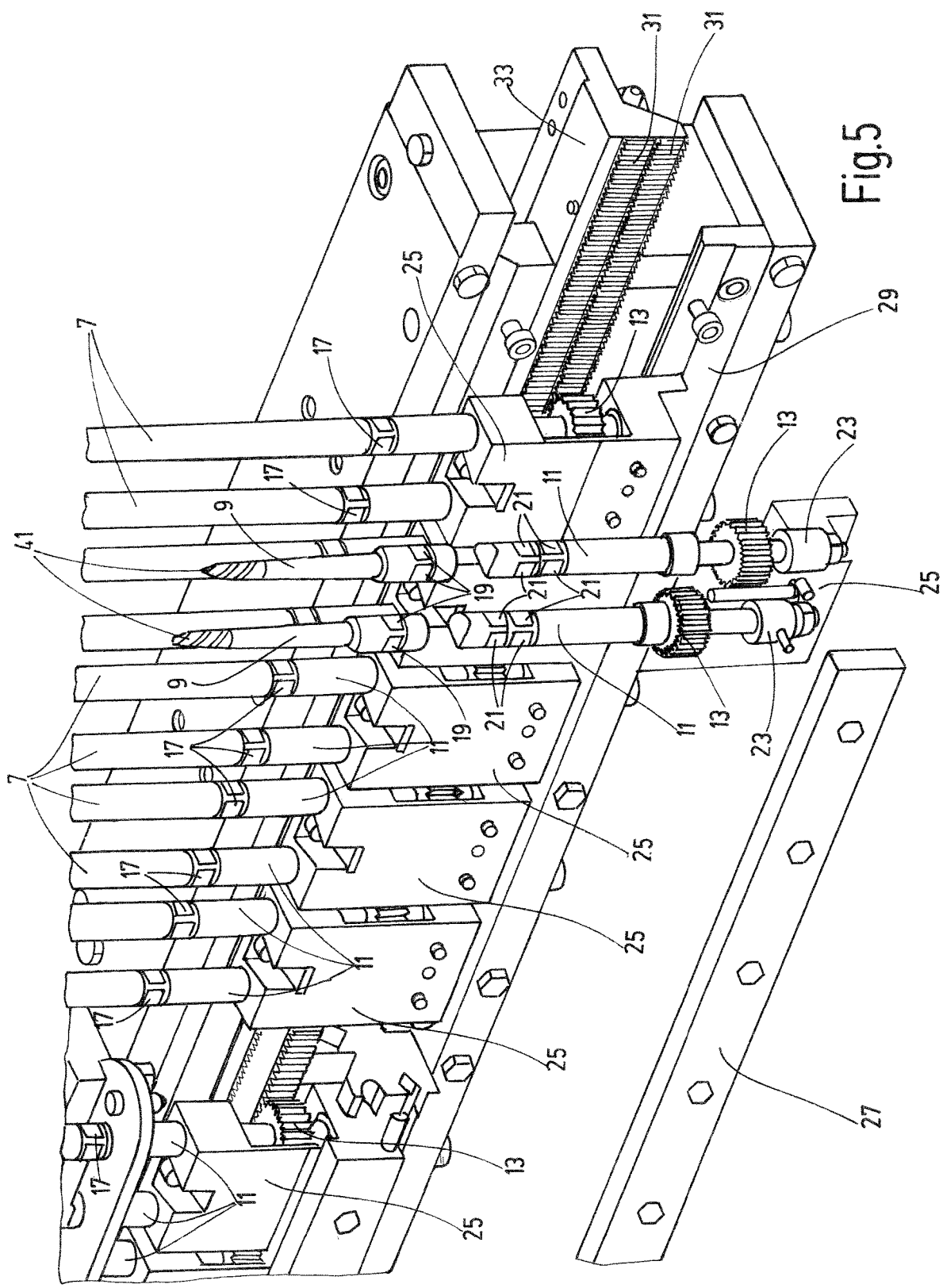
FIG. 5 is a partial perspective oblique view, partly exploded, of a part of the device of the embodiment, viewed towards the front.
Figure 6:
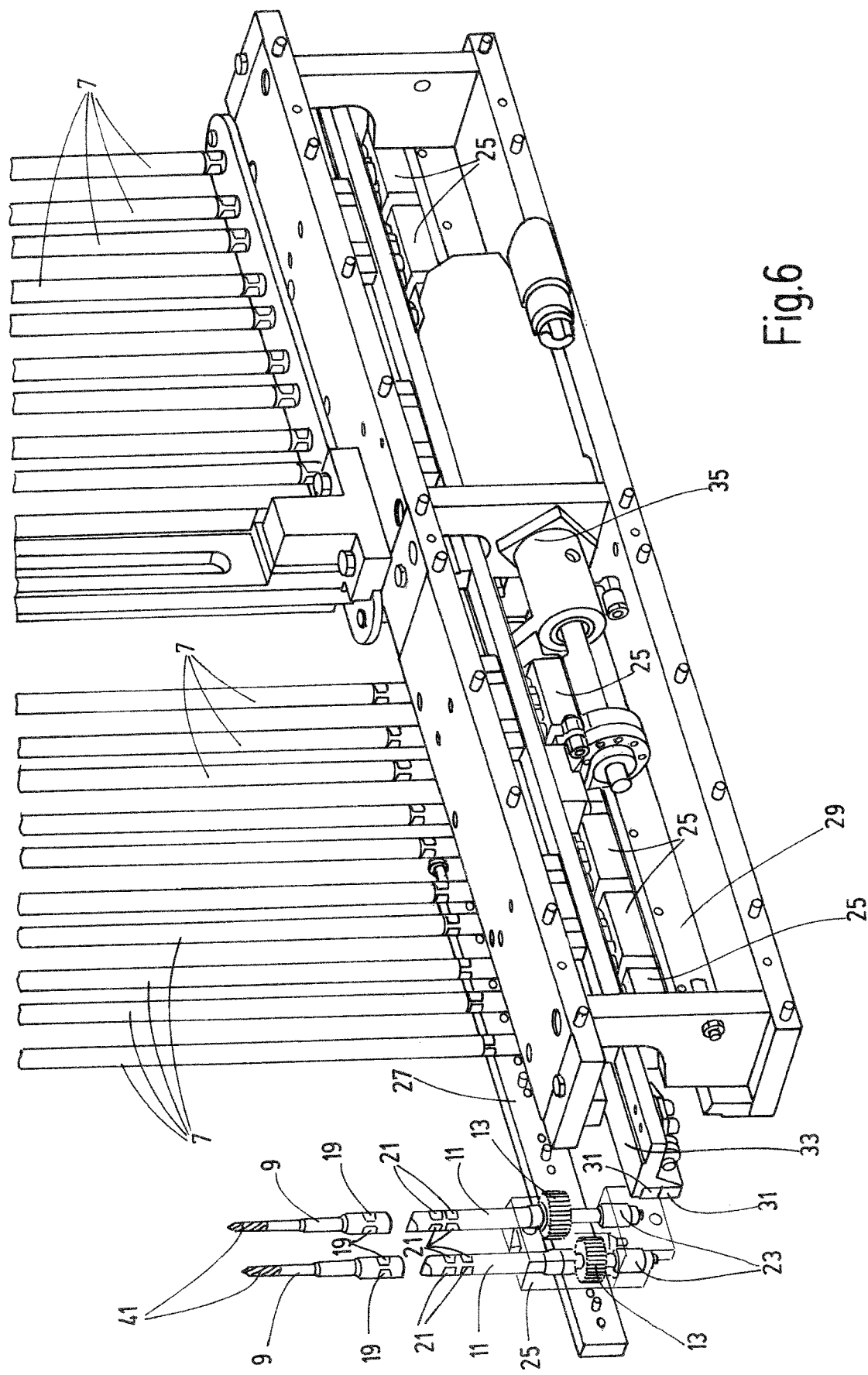
FIG. 6 is a partial perspective view, drawn at the scale of FIG. 5 and partly exploded, of the part of the device of the embodiment, viewed towards the rear.
Figure 7:
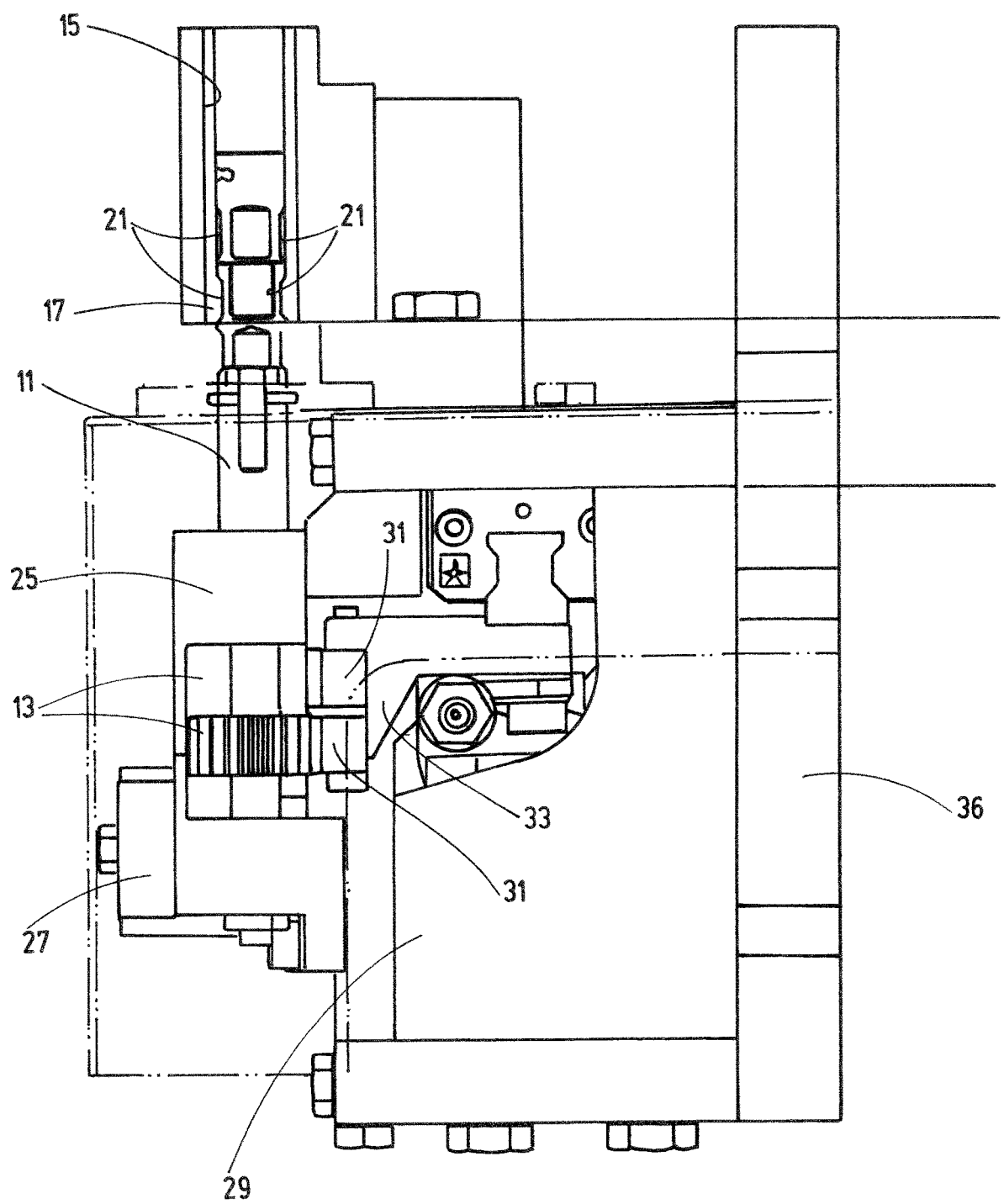
FIG. 7 is a partial side view of the device of the embodiment, further enlarged compared to FIGS. 5 and 6 and schematically simplified.

The guiding and holding device has rod bodies 7, which are only partially numbered in the drawing and are arranged in series. The number of rod bodies 7 matches the number of blind holes 5. As engagement parts for the pin-shaped engagement in the blind holes 5, each rod body 7 has a drill head 9 at its free end. At the lower end section opposite from the drill head 9, the rod bodies 7 have a shaft part 11, each having a pinion 13 attached thereto, see FIGS. 5 to 7. The rod bodies 7 have an elongated connecting tube 15 (see FIG. 7) between their drill head 9 and their shaft part 11. In FIGS. 5 and 7, the lower end 17 of the connecting tubes 15 is shown. For the connection of the lower ends 17 to a respective shaft part 11, the lower ends 17 are provided with flattenings 21 in their end sections. The flattenings 21, as FIG. 7 shows, the tube end 17 of the connecting tubes 15 is crimped. In the same way, the upper tube ends of the connecting tubes 15 are crimped with flattenings 19 for the connection to the drill heads 9. The flattenings 19 are formed at the lower end of the drill heads 9, as FIGS. 5 and 6 show.

The shaft parts 11 together with their pinions 13 are each supported in pairs by rotary bearings 23 in a block-shaped rotary support 25. A retaining strip 27 is used to attach them to a carrier 29. As FIGS. 5 and 6 show most clearly, for every pinion pair located in a rotary support 25, the pinions 13 are arranged at an axial distance from each other, which distance is slightly greater than the axial height of a pinion 13. Therefore, the axes of the shaft parts 11, and thus, of the rod bodies 7 can be arranged at distances from each other, which distances are smaller than the pinion diameter. A pair of toothed racks 31 is provided as a pinion drive for the rotary drive of the rod bodies 7. The toothed racks 31 are mounted one above the other on a slide 33, which can be displaced along the row of pinions 13 by a linear drive, in this embodiment, in the form of a spindle drive 35 (FIG. 6) driven by an electric motor.

As FIGS. 1 to 4 show and most clearly FIG. 1, the device has a frame 36, which, starting from a base structure 37 on the floor side, extends upwards and forms the support for a horizontal set-down table 38 in the upper area. As the comparison of FIGS. 1 to 4 shows, the entire bar unit 39, formed by carrier 29, pinion drive 31, rotary support 25 and bar bodies 7, can be moved vertically on the frame 36 in both directions of travel. In the fully raised position shown in FIG. 1, the bar bodies 7 pass through the set-down table 38. A linear drive is also provided as the drive for this motion device, which is designated here as the first motion device, whereas the pinion drive 31 generating the rotation of the bar bodies 7 is designated as the second motion device, and in this case is a spindle drive 40 operated by an electric motor (FIG. 1).

Figure 1:
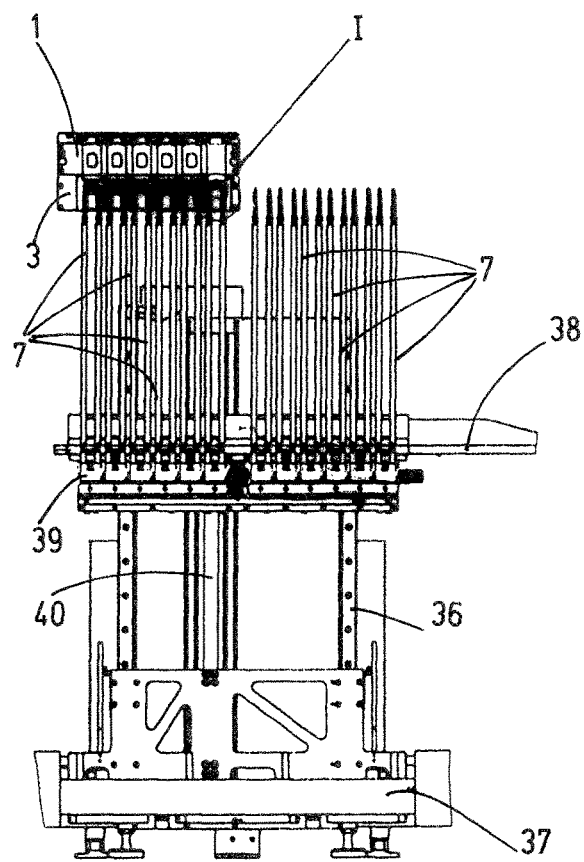
FIG. 1 is a front view of a device according to an exemplary embodiment of the invention, wherein a first operating state is shown.

FIG. 1 shows an operating state of a working cycle of the device, wherein in the operating state the rod bodies 7 are moved into an upper end position, in which their drill heads 9, cf. FIG. 1a, are pushed into the blind holes 5 of an respective ampoule block 1 to be transferred. For the sake of clarity, only a single ampoule block 1 is indicated schematically in FIG. 1. In this operating state, the tip, formed by a drilling thread 41, of the respective drill head 9 is in engagement with the blind holes 5 of the ampoule block 1, which is still warm due to the forming process and is therefore in a partially plasticized state.

Figure 2A:
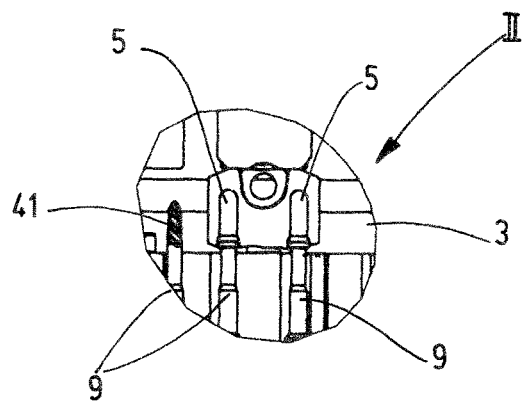
FIG. 2a is an enlarged partial front view of the area designated by II in FIG. 2.
Figure 2:
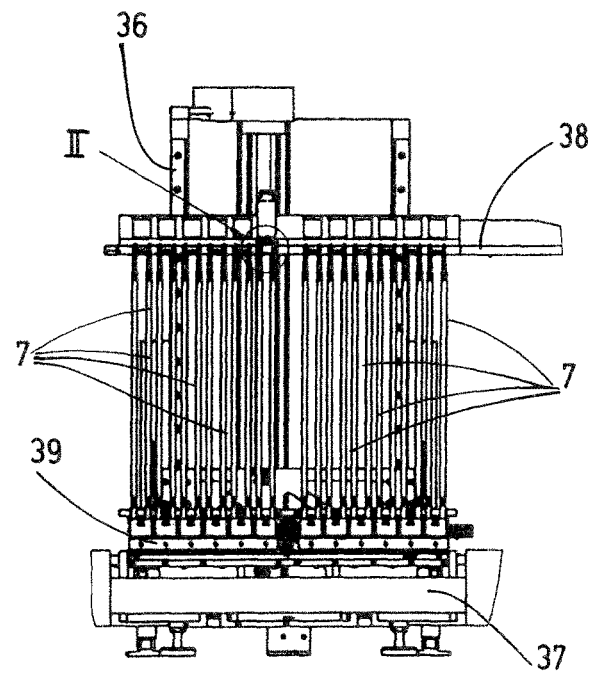
FIG. 2 is a front view of the device of FIG. 1, wherein a second operating state is shown.

FIG. 2 shows the operating state of the next working step, in which the rod bodies 7 together with the respective ampoule block 1 are moved downwards so far that the concerned ampoule blocks 1 rest on the set-down table 38, while the drill threads 41 of the drill heads 9 are still in engagement with the blind holes 5, as shown in FIG. 2a. As shown in FIG. 3, the rod bodies 7 then move further downwards, while the rod bodies 7 are rotated resulting in the drill threads 41 of the drill heads 9 extending from the blind holes 5 in the manner of an unscrewing motion, cf. FIG. 3a.

Figure 3A:
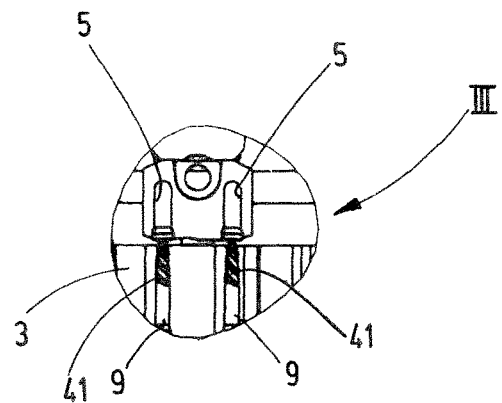
FIG. 3a is an enlarged partial front view of the area designated by III in FIG. 3.
Figure 4A:
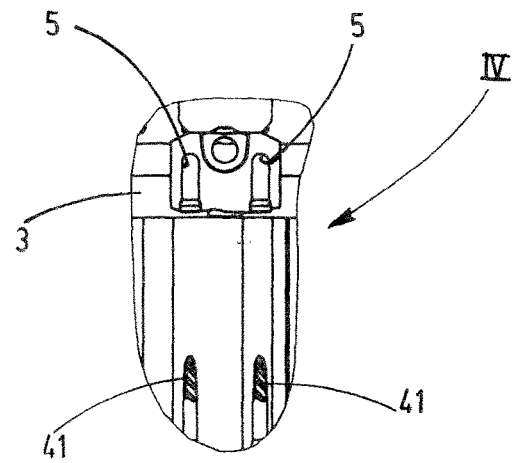
FIG. 4a shows an enlarged partial view of the area designated by IV in FIG. 4.
Figure 3:
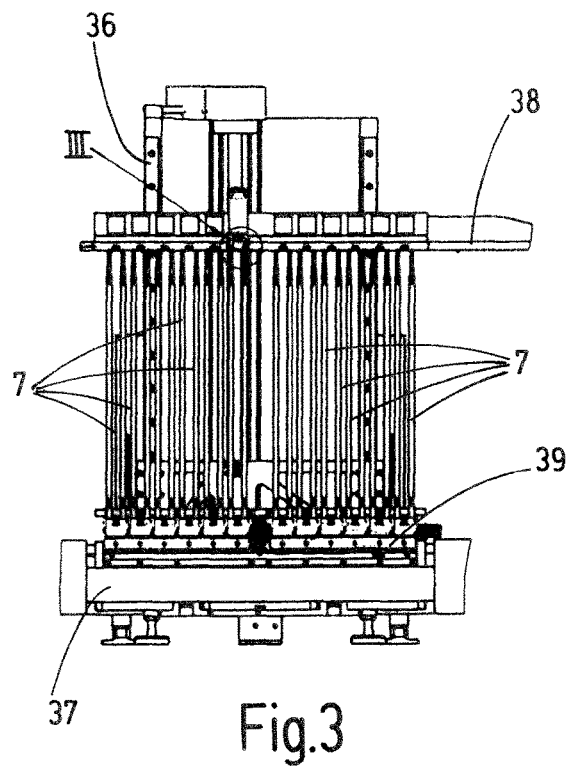
FIG. 3 is a front view of the device of FIG. 1, wherein a third operating state is shown.
Figure 4:
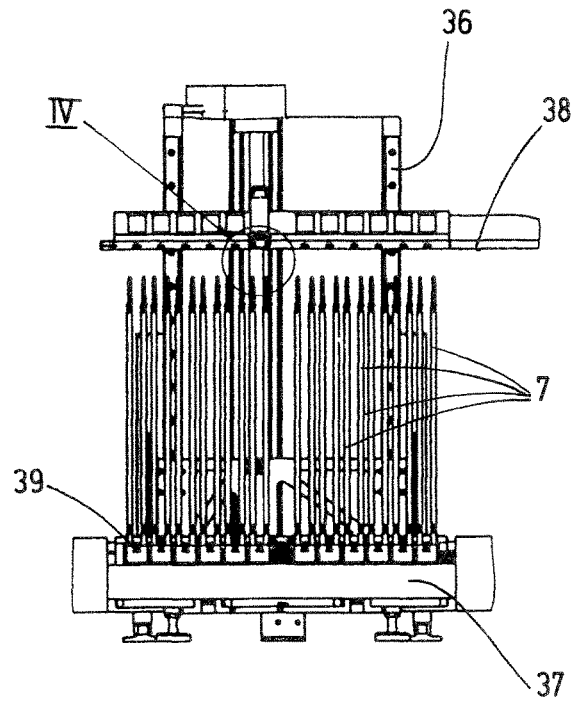
FIG. 4 shows a corresponding front view of the embodiment, wherein a third operating state is shown.

In contrast to FIG. 1, the ampoule block 1 has been omitted in FIGS. 2, 3 and 4 for ease of presentation, but FIGS. 2a, 3a and 4a show the respective assigned states of engagement between the guiding and holding device and the ampoule block 1 for the underside of an ampoule or a container of this block 1.

In conclusion, FIG. 4 shows the final state, in which the rod bodies 7 are completely moved down, and the ampoule blocks 1 are completely released on the set-down table 38. The design of the drill heads 9 having the drill thread 41 at the end, which in the pushed-in position is enclosed by the still warm plastic material, permits in conjunction with the rotary motion an undisturbed removal of the rod bodies 7 forming the guiding and holding device from the engagement with the ampoule blocks 1.

While one embodiment has been chosen to illustrate the invention, it will be understood by those skilled in the art that various changes and modifications can be made therein without departing from the scope of the invention as defined in the claims.

The invention claimed is:

1. A device for removing a plastic product, comprising: multiple guide-holders capable of being inserted into and removed from the plastic product in a plastic moulding process to accept and subsequently release the plastic product for further manufacturing after moulding, the guide-holders each having a first rod body with first and second free ends; the guide-holders being mounted on an axial mover capable of inserting and removing the guide-holders into and out of the plastic product by moving the guide-holders axially in opposite axial directions of travel along an axis; a rotational mover capable of rotationally moving the guide-holders about respective axes parallel to the axis; and a pinion engaged by a pinion drive as part of the rotational mover and a first rotary bearing on each first rod body adjacent to the pinion and each second free end of each first rod body; and a drill head at each first free end of each first rod body.

2. The device according to claim 1 wherein first and second guide-holders are arranged in a pair in a rotary receptacle, the pinions of the first and second rod bodies being arranged at an axial distance from each other within the rotary receptacle along the axis, the axial distance being equal to at least an overall height of at least one of the pinions.

3. The device according to claim 2 wherein the rotary receptacle is arranged on a carrier as part of the axial mover, the carrier moving the rod bodies of the first and second guide-holders by a drive in a parallel arrangement to each other in a same axial direction of movement below a set-down table, allowing the rod bodies of the first and second guide-holders to pass through and on an upper side of the set-down table and the plastic product to be set down on the set-down table separating the plastic product from the rod bodies of the first and second guide-holders.

4. The device according to claim 3 wherein the pinion drive comprises first and second toothed racks being arranged one above the other, engaging and rotating the pinions of the rod bodies of the first and second guide-holders, respectively, and forming part of the rotational mover, the first and second toothed racks being combined to form a pair accommodated in the rotary receptacle being on the carrier.

5. The device according to claim 4 wherein the first and second toothed racks are arranged on a sliding carriage movably guided along a support by the pinion drive.

6. The device according to claim 5 wherein the pinion drive and a mover drive of the axial mover each comprise a linear drive.

7. The device according to claim 6 wherein each of the linear drives comprises an electric spindle drive.

8. The device according to claim 1 wherein each of the drill heads comprises a drill bit with a cutting thread.

\* \* \* \* \*